United States Patent
Shan et al.

(10) Patent No.: US 10,544,013 B2
(45) Date of Patent: Jan. 28, 2020

(54) POWER TRANSMISSION CONTROL METHOD AND DEVICE FOR CRANE AND CRANE

(71) Applicant: XUZHOU HEAVY MACHINERY CO., LTD., Xuzhou, Jiangsu Province (CN)

(72) Inventors: Zenghai Shan, Xuzhou (CN); Quan Dong, Xuzhou (CN); Shuai Wang, Xuzhou (CN); Yunbo Xiao, Xuzhou (CN); Zhende Zhang, Xuzhou (CN); Jie Kong, Xuzhou (CN); Jing Zhao, Xuzhou (CN)

(73) Assignee: Xuzhou Heavy Machinery Co., Ltd., Xuzhou (CN)

( * ) Notice: Subject to any disclaimer, the term of this patent is extended or adjusted under 35 U.S.C. 154(b) by 166 days.

(21) Appl. No.: 15/531,652

(22) PCT Filed: Nov. 6, 2015

(86) PCT No.: PCT/CN2015/093973
§ 371 (c)(1),
(2) Date: May 30, 2017

(87) PCT Pub. No.: WO2016/086753
PCT Pub. Date: Jun. 9, 2016

(65) Prior Publication Data
US 2017/0334684 A1 Nov. 23, 2017

(30) Foreign Application Priority Data

Dec. 2, 2014 (CN) .......................... 2014 1 0720540

(51) Int. Cl.
*B66C 13/18* (2006.01)
*F15B 1/02* (2006.01)
(Continued)

(52) U.S. Cl.
CPC ................ *B66C 13/18* (2013.01); *B60K 6/12* (2013.01); *B66C 13/00* (2013.01); *B66C 23/54* (2013.01);
(Continued)

(58) Field of Classification Search
CPC ....................................................... B60K 6/12
See application file for complete search history.

(56) References Cited

U.S. PATENT DOCUMENTS

| | | | |
|---|---|---|---|
| 6,971,463 B2 * | 12/2005 | Shore ....................... | B60K 6/12 180/165 |
| 6,991,581 B2 * | 1/2006 | Murakami ............. | B60K 6/365 477/3 |

(Continued)

FOREIGN PATENT DOCUMENTS

| | | |
|---|---|---|
| CN | 101445036 | 6/2009 |
| CN | 101791943 | 8/2010 |

(Continued)

OTHER PUBLICATIONS

Supplementary European Search Report for corresponding EP Application No. 15865399.8 dated Sep. 7, 2018, 8 pages.

(Continued)

*Primary Examiner* — Todd M Melton
(74) *Attorney, Agent, or Firm* — Myers Bigel, P.A.

(57) ABSTRACT

The present invention discloses a power transmission control method and device for a crane and the crane. The method includes: setting the maximum working displacement of a secondary element corresponding to each gear of the crane; determining the current gear state and specific gear of the crane; determining the working mode of the secondary element from the gear state, and setting the
(Continued)

maximum allowable displacement of the secondary element as the maximum working displacement corresponding to the specific gear.

13 Claims, 4 Drawing Sheets

(51) Int. Cl.
    *B60K 6/12*     (2006.01)
    *B66C 23/00*     (2006.01)
    *F16H 61/02*     (2006.01)
    *F16H 59/36*     (2006.01)
    *B66C 13/00*     (2006.01)
    *B60W 50/00*     (2006.01)

(52) U.S. Cl.
    CPC ............... *F15B 1/02* (2013.01); *F15B 1/022* (2013.01); *F16H 59/36* (2013.01); *F16H 61/02* (2013.01); *B60W 2050/0026* (2013.01); *B60W 2300/16* (2013.01); *B60W 2510/101* (2013.01); *B60W 2510/1005* (2013.01); *Y02T 10/6208* (2013.01); *Y02T 10/92* (2013.01)

(56) References Cited

U.S. PATENT DOCUMENTS

| | | | |
|---|---|---|---|
| 7,147,078 B2* | 12/2006 | Teslak | B60K 6/12 180/305 |
| 8,914,177 B2 | 12/2014 | Kaneko et al. | |
| 9,352,743 B2* | 5/2016 | Davis | B60K 6/12 |
| 9,765,502 B2* | 9/2017 | Heybroek | F16H 47/04 |
| 2009/0203497 A1 | 8/2009 | Imediegwu | |
| 2010/0276221 A1 | 11/2010 | Rose et al. | |
| 2014/0124281 A1 | 5/2014 | Moore | |

FOREIGN PATENT DOCUMENTS

| | | |
|---|---|---|
| CN | 101846121 | 9/2010 |
| CN | 102080675 | 6/2011 |
| CN | 201896799 | 7/2011 |
| CN | 102536971 | 7/2012 |
| CN | 103671365 | 3/2014 |
| CN | 204573066 | 8/2015 |
| EP | 0366080 | 5/1990 |
| EP | 1637384 | 3/2006 |
| EP | 2792522 | 10/2014 |
| JP | 2012062726 | 3/2012 |

OTHER PUBLICATIONS

International Search Report (w/translation) and Written Opinion for PCT/CN2015/093973 dated Feb. 2, 2016, 12 pages.

* cited by examiner

POWER TRANSMISSION CONTROL METHOD AND DEVICE FOR CRANE AND CRANE

RELATED APPLICATIONS

The present application is a 35 U.S.C. § 371 national phase application of PCT International Application No. PCT/CN2015/093973, filed Nov. 6, 2015, which claims priority to Chinese Patent Application No. 201410720540.7 filed Dec. 2, 2014, the disclosures of which are hereby incorporated herein by reference in their entireties.

FIELD OF THE INVENTION

The present invention relates to the technical filed of engineering machinery, and in particular to a power transmission control method and device for a crane and the crane.

BACKGROUND OF THE INVENTION

With rapid development of industrial technologies around the world, problems of energy shortage and environmental pollution are increasingly serious, and the hybrid power technology is regarded as one of the effective solutions for solving the problems of energy shortage and environmental pollution. A wheeled crane mostly travels in urban areas or among cities, but due to influence of road environment, frequent starting, acceleration, braking and climbing occur in the travelling process. In addition, the crane is heavy, and has a higher speed relative to other engineering machinery vehicles, so use of the traditional mechanical friction braking manner will cause waste of a large amount of kinetic energy. In the current automobile industry, mostly used is the oil-electric hybrid power technology, which is generally applied to limousines and buses but is not applicable to such super-tonnage engineering vehicle as the wheeled crane due to cost and driving force problems. In consideration that many hydraulic systems have the same characteristics as electric systems in some aspects, oil-hydraulic hybrid power becomes another choice for super-tonnage load-carrying vehicles. The wheeled crane has certain advantages in the aspect of oil-hydraulic hybrid power due to its own hydraulic system, so the oil-hydraulic hybrid power application for vehicle travelling can be accomplished by only slight system modification, and furthermore, the hydraulic system also can be applied to hoisting power for an upper structure.

However, during the research of applying oil-hydraulic hybrid power to the wheeled crane, it is found that the hydraulic system often has a large operating torque and its performance is not easy to control. When the hydraulic system is applied to a multi-gear vehicle, it is very likely to cause large influence on the vehicle if output control of the braking force and the driving force is unreasonable, and particularly when the difference of gear speed ratios is large, the difference of required torques is large too. Therefore, the demand-control concept of the torque of the hybrid power system is proposed, which is desired to be helpful in some extent in improving the travelling stability of the wheeled crane added with the parallel-type oil-hydraulic hybrid power system. Currently, domestic research on oil-hydraulic hybrid power is not deep enough, and particularly oil-hydraulic hybrid power has not been applied to such an engineering machinery product as the wheeled crane. Some mentioned control methods and steps are mostly applications of oil-electric hybrid power or applications of oil-hydraulic hybrid power to other engineering machinery vehicles.

The torque control method in the prior art is summarized as follows:

A throttle pedal signal and a current vehicle speed signal are obtained through collection by a sensor, then the obtained throttle signal and vehicle speed signal are calculated and through calculation, a target driving torque of the vehicle is determined, and finally respective output torques of an engine and a motor are determined according to a certain algorithm. Such a control method ignores the influence of gears, without considering the problem that different gears generate power impact on a vehicle, and such a problem is particularly obvious for a hybrid power system with a front engine, which will reduce the service life of the hybrid power system and cause certain influence on driving comfort of a driver at the same time and driving safety is also affected.

In the prior control method steps, since hybrid power control is not actually made to such a vehicle as the wheeled crane, some characteristics of the crane itself are not considered, for example, the crane has large inertia, relatively high speed and many gears, and in the prior method, the problems of power impact generated in processes of energy storage and release and driving comfort of the driver are not considered.

First, the crane has many forward gears and generally employs a multi-gear box, and correspondingly speed ratios of a gearbox are greatly different between a high gear and a low gear. For a hybrid power system with a front engine, the same torque provided by a secondary element will be increased by several or a dozen of times after being transferred to a transmission shaft, thus will generate a bigger power impact; Second, in the prior method steps, it is also not considered that at the moment of energy release completion, the problem of instantaneous driving force reduction due to sudden disappearance of the driving torque provided by the secondary element will cause power impact, which not only does not conform to the operation habit of the driver but also influences the driving comfort of the driver, and seriously, it will even influence judgment of the driver and affect safety;

Third, in the prior art method, the influence of the rotating speed on a recovery process is not considered. In the energy recovery process, the rotating speed of the secondary element is gradually reduced along with gradual energy recovery, when the rotating speed is reduced to the minimum effective rotating speed, a control program will turn off the secondary element to enable the displacement of the secondary element to return to zero, and if sudden turning off results in sudden reduction of an actual vehicle braking torque, the driver will feel vehicle jitter obviously, and even the driving safety will be influenced.

SUMMARY OF THE INVENTION

To this end, a technical problem to be solved by the present invention is provide a power transmission control method for a crane, which can control the maximum displacement of the secondary element for different gears.

A power transmission control method for a crane includes: setting the maximum working displacement of a secondary element corresponding to each gear of the crane; determining the current gear state and specific gear of the crane; determining the working mode of the secondary element from the gear state, and setting the maximum allowable displacement of the secondary element as the maximum working displacement corresponding to the specific gear.

According to an embodiment of the present invention, wherein the gear state is determined from a collected gear signal, the gear state including a neutral gear, a reverse gear and a forward gear; the method further includes: controlling the secondary element to stop operation when determining the gear state is the neutral gear or reverse gear.

According to an embodiment of the present invention, the method further includes: determining a travelling state of the crane from the gear state and an acquired throttle signal and brake signal, the travelling state comprising acceleration and braking; collecting a rotating speed signal of the secondary element and a pressure signal of a hydraulic accumulator when the travelling state is acceleration; controlling the secondary element to stop operation when the rotating speed of the secondary element is determined as exceeding a preset maximum rotating speed threshold or the pressure of the hydraulic accumulator is lower than a minimum release pressure threshold; calculating the working displacement of the secondary element in real time when the rotating speed of the secondary element isn't determined as exceeding the preset maximum rotating speed threshold and the pressure of the hydraulic accumulator is higher than the minimum release pressure threshold, wherein the working displacement is less than or equal to the maximum allowable displacement of the secondary element.

According to an embodiment of the present invention, the method further includes: multiplying the working displacement of the secondary element by a preset first buffer coefficient to obtain an actual working displacement of the secondary element when the pressure of the hydraulic accumulator is determined to be lower than a preset buffer pressure threshold.

According to an embodiment of the present invention, the method further includes: collecting a pressure signal of the hydraulic accumulator and a rotating speed signal of a transmission shaft when the travelling state is braking; controlling the secondary element to stop operation when the rotating speed of the transmission shaft is not determined within a preset recovery rotating speed range or the hydraulic accumulator is in a full state; calculating the working displacement of the secondary element in real time when the rotating speed of the transmission shaft is determined within the preset recovery rotating speed range and the hydraulic accumulator is in a non-full state, wherein the working displacement is less than or equal to the maximum allowable displacement of the secondary element.

According to an embodiment of the present invention, the method further includes: multiplying the working displacement of the secondary element by a preset second buffer coefficient to obtain an actual working displacement of the secondary element when a forward rotating speed of the transmission shaft is determined within a preset buffer rotating speed range, and reducing the actual working displacement of the secondary element to zero when the forward rotating speed of the transmission shaft is the minimum effective rotating speed.

A technical problem to be solved by the present invention is to provide a power transmission control device for a crane, which can control the maximum displacement of the secondary element for different gears.

A power transmission control device for a parallel oil-hydraulic hybrid power crane includes: a displacement threshold setting unit, configured to set the maximum working displacement of a secondary element corresponding to each gear of the crane; a gear obtaining unit, configured to determine the current gear state and specific gear of the crane; and a displacement controlling unit, configured to determine the working mode of the secondary element from the gear state, and set the maximum allowable displacement of the secondary element as the maximum working displacement corresponding to the specific gear.

According to an embodiment of the present invention, the gear obtaining unit is also configured to determine the gear state from a collected gear signal, the gear state comprising a neutral gear, a reverse gear and a forward gear, wherein the secondary element is controlled to stop operation when determining the gear state is the neutral gear or reverse gear.

According to an embodiment of the present invention, the gear obtaining unit is further configured to determine a travelling state of the crane from the gear state and a collected throttle signal and brake signal; the travelling state comprising acceleration and braking; the displacement controlling unit is further configured to collect a rotating speed of the secondary element and a pressure signal of a hydraulic accumulator when the travelling state is accelerating; control the secondary element to stop operation when determining the rotating speed of the secondary element exceeds a preset maximum rotating speed threshold or the pressure of the hydraulic accumulator is lower than a minimum release pressure threshold; and calculate the working displacement of the secondary element when determining the rotating speed of the secondary element does not exceed the preset maximum rotating speed threshold and the pressure of the hydraulic accumulator is higher than the minimum release pressure threshold, wherein the working displacement is less than or equal to the maximum allowable displacement of the secondary element.

According to an embodiment of the present invention, the displacement controlling unit is further configured to multiply the working displacement of the secondary element by a preset buffer coefficient to obtain an actual working displacement of the secondary element when determining the pressure of the hydraulic accumulator is lower than a preset buffer pressure threshold.

According to an embodiment of the present invention, the displacement controlling unit is further configured to collect a pressure signal of the hydraulic accumulator and a rotating speed signal of a transmission shaft when the travelling state is braking; control the secondary element to stop operation when determining the rotating speed of the transmission shaft is not within a preset recovery rotating speed range and the hydraulic accumulator is in a full state; and calculate the working displacement of the secondary element when determining the rotating speed of the transmission shaft is within the preset recovery rotating speed range and the hydraulic accumulator is in a non-full state wherein the working displacement is less than or equal to the maximum allowable displacement of the secondary element.

According to an embodiment of the present invention, the discharge controlling unit is further configured to multiply the working displacement of the secondary element by a preset buffer coefficient to obtain an actual working displacement of the secondary element when determining a forward rotating speed of the transmission shaft is within a preset buffer rotating speed range, and reduce the actual working displacement of the secondary element to zero when the forward rotating speed of the transmission shaft is the minimum effective rotating speed.

A parallel oil-hydraulic hybrid power crane includes the above power transmission control device for the parallel oil-hydraulic hybrid power crane.

According to the power transmission control method and device for the crane and the crane of the present invention, the maximum displacement of the secondary element is controlled for different gears, thus the power impact generated by the hybrid power system during gear shift can be effectively reduced. A buffer mode is added during energy release, utilization and recovery to avoid influence on a vehicle due to loss of instant power generated at the moment of energy release completion and avoid vehicle jitter due to instable power resulting from the vehicle at low speed or the system suddenly disconnected, thus improving the comfort and safety of the driver, and the rotating speed of the secondary element is limited, which can improve the service life and energy recovery efficiency of the secondary element.

BRIEF DESCRIPTION OF THE DRAWINGS

The accompanying drawings illustrated herein, constituting a part of the present application, are used for providing further understanding of the present invention, and exemplary embodiments and illustration thereof in the present invention are used for explaining the present invention, instead of improperly limiting the present invention. In the accompanying drawings.

DETAILED DESCRIPTION OF THE EMBODIMENTS

The present invention will be described more comprehensively with reference to the accompanying drawings in which exemplary embodiments of the present invention are illustrated. Technical solutions in the embodiments of the present invention will be described below clearly and completely in combination with the accompanying drawings in the embodiments of the present invention. Obviously, the described embodiments are merely a part of, instead of all of, the embodiments of the present invention. Based on the embodiments in the present invention, all other embodiments obtained by those of ordinary skill in the art without creative effort are within the protection scope of the present invention. The technical solution of the present invention will be described below in multiple aspects in conjunction with various figures and embodiments.

Figure 1:
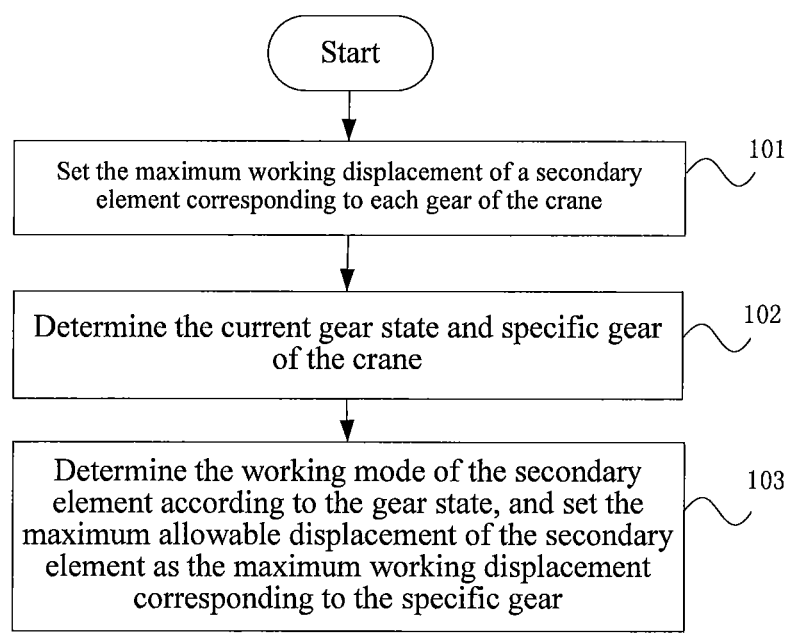
FIG. 1 is a flow chart of an embodiment of a power transmission control method for a crane according to the present invention.

FIG. 1 is a flow chart of an embodiment of a power transmission control method for a crane according to the present invention, the power transmission control method comprising the following steps as shown in FIG. 1:

Step 101, setting the maximum working displacement of a secondary element corresponding to each gear of the crane;

Step 102, determining the current gear state and specific gear of the crane;

Step 103, determining the working mode of the secondary element from the gear state, and setting the maximum allowable displacement of the secondary element as the maximum working displacement corresponding to the specific gear.

In the hydraulic system, an element converting mechanical energy into hydraulic energy is known as a primary element, such as a hydraulic pump. An element capable of interconversion between hydraulic energy and mechanical energy is known as a secondary element, such as a hydraulic pump/motor and a hydraulic transformer.

The secondary element of the present invention may be a hydraulic pump/motor, and the displacement of the secondary element can be changed by changing the swing angle of its swash plate. The secondary element can rotate in two directions, and can work in four quadrants on a rotating speed-torque coordinate plane. It can work either in a hydraulic motor working condition or a hydraulic pump working condition.

The crane of the present invention can be a parallel hydraulic hybrid power vehicle, which means that an energy recovery system consisting of the secondary element and a hydraulic accumulator is added while reserving transmission chains of a traditional vehicle, thus forming dual-power drive. The two power sources can provide power simultaneously or individually, and two or more corresponding executive elements can drive a load simultaneously. An engine is not coupled to the secondary element in the hydraulic system directly, but coupled to a mechanical transmission system. In this way, it can operate in a hydraulic hybrid power vehicle mode, and also can travel like the traditional vehicle.

In one embodiment, the gear state is determined from a collected gear signal, the gear state including a neutral gear, a reverse gear and a forward gear. When the gear state is determined as the neutral gear or reverse gear, the secondary element is controlled to stop operation.

The travelling state of the crane is determined from the gear state and a collected throttle signal and brake signal. The travelling state includes acceleration and braking. When the travelling state is accelerating, a rotating speed signal of the secondary element and a pressure signal of the hydraulic accumulator are collected.

When the rotating speed of the secondary element is determined as exceeding a preset maximum rotating speed threshold or the pressure of the hydraulic accumulator is lower than a minimum release pressure threshold, the secondary element is controlled to stop operation.

When the rotating speed of the secondary element is determined as not exceeding the preset maximum rotating speed threshold and the pressure of the hydraulic accumulator is higher than the minimum release pressure threshold, the working displacement of the secondary element is calculated in real time, wherein the working displacement is less than or equal to the maximum allowable displacement of the secondary element.

When the pressure of the hydraulic accumulator is determined to be lower than a preset buffer pressure threshold, the working displacement of the secondary element is multiplied by a preset first buffer coefficient to obtain an actual working displacement of the secondary element.

In one embodiment, when the travelling state is braking, a pressure signal of the hydraulic accumulator and a rotating speed signal of a transmission shaft are acquired. When the rotating speed of the transmission shaft is not determined within a preset recovery rotating speed range or the hydraulic accumulator is in a full state, the secondary element is controlled to stop operation.

When the rotating speed of the transmission shaft is determined within the preset recovery rotating speed range and the hydraulic accumulator is in a non-full state, the working displacement of the secondary element is calculated in real time, wherein the working displacement is less than or equal to the maximum allowable displacement of the secondary element.

When a forward rotating speed of the transmission shaft is determined within a preset buffer rotating speed range, the working displacement of the secondary element is multiplied by a preset second buffer coefficient to obtain an actual working displacement of the secondary element, and when the forward rotating speed of the transmission shaft is the minimum effective rotating speed, the actual working displacement of the secondary element is reduced to zero.

According to the power transmission control method for the crane of the present invention, demand control is performed on energy recovery and release, a maximum demand value of the displacement of the secondary element is scaled at different gears through experiments, then a gear signal is collected, and the maximum value at the current gear is determined as a limit to the maximum braking or driving torque at this gear.

Throttle and brake signals are collected to distinguish whether the vehicle is in an acceleration or deceleration state, and the brake signal is preferential. If the vehicle is in the acceleration state, a final acceleration control signal is obtained by a certain algorithm according to the throttle signal, the pressure of the energy accumulator and the like. If the vehicle is in the deceleration state, a final brake control signal is obtained by an algorithm according to the brake signal, the rotating speed of the transmission shaft and the like.

According to the power transmission control method for the crane of the present invention, the gear signal of a gearbox, the pressure signal of the energy accumulator, the rotating speed signal of the transmission shaft and the like are incorporated into control of the secondary element, instead of solely employing the throttle or brake signal to directly control the displacement of the secondary element, thus achieving real demand control, therefore, not only can release and use of the recovered energy be efficiently achieved, but also power impact caused by gear shift, energy storage and energy release completion is reduced as much as possible, the operation comfort of the driver can be improved to a certain extent and the whole hybrid power system can be protected.

Figure 2:
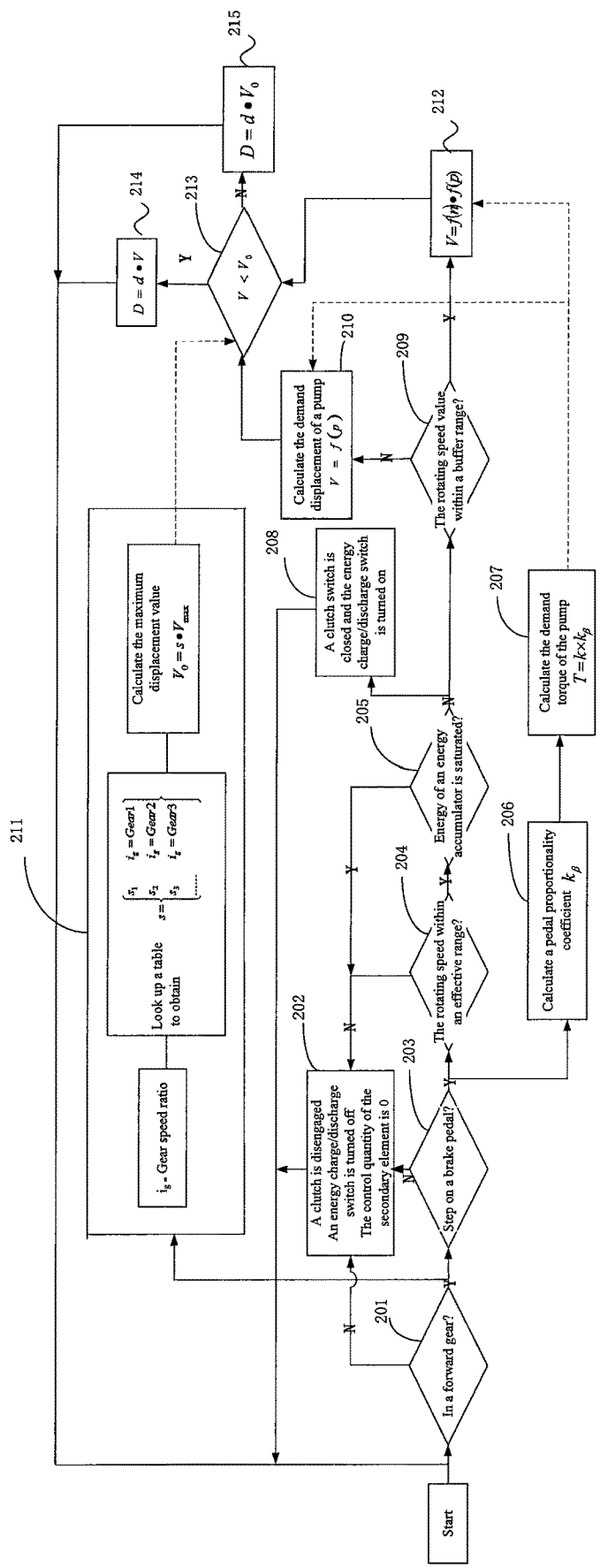
FIG. 2 is a flow chart of energy recovery of the power transmission control method for the crane according to the present invention.

FIG. 2 is a flow chart of energy recovery of the power transmission control method for a crane according to the present invention, the power transmission control method comprising the following steps as shown in FIG. 2:

Step 201, determining the current vehicle is in a neutral gear state, a reverse gear state or a forward gear state from signals collected by a sensor. If the vehicle is determined in the forward gear state, the method proceeds to step 211.

Step 211, looking up a table according to the calculated gear value to obtain a displacement attenuation coefficient, and then calculating with both a maximum displacement value of the secondary element and the displacement attenuation coefficient to obtain the maximum allowable displacement of the secondary element at the current gear.

Step 202, if the vehicle is in the neutral or reverse state, allowing the hybrid power system not to participate working, specifically, a clutch being disengaged, an energy charging/discharge switch being turned off and the displacement of the secondary element being 0.

Step 203, determining whether a brake pedal is stepped on.

Step 204, determining whether the rotating speed is in an effective range, and determining whether the vehicle is currently in a starting or accelerating state from a throttle voltage signal and front and back pressure signals of a brake valve collected by the sensor. If the brake pedal is not stepped on and the throttle pedal signal is higher than a minimum effective value, the system is in an accelerating state. Whether a design range is exceeded is determined from a rotating speed value of the secondary element collected by the sensor to protect the secondary element, and if yes, the system alarms and stops working.

Steps 205, 206, 207 and 210, judging according to a pressure value of the energy accumulator collected by the sensor, if the pressure value is higher than the minimum release pressure, performing the next step, and if the pressure value is lower than the minimum release pressure, allowing the system not to work. A driving torque needed by the current secondary element is calculated according to a maximum acceleration of the vehicle, a vehicle mass, a wheel diameter, a gearbox transmission ratio, an axle speed ratio, a power coupler speed ratio and a throttle signal.

Whether the system goes into a buffer state is determined from the pressure signal of the energy accumulator collected by the sensor, and if the current pressure value is lower than a set buffer pressure value, it indicates the system has entered the buffer state, and otherwise, the system is in a normal state.

Step 212, if the system is in the normal state, calculating a demand displacement of the secondary element according to the demand torque value obtained in the above step and the current pressure value of the energy accumulator. If the system is in the buffer state, a displacement is calculated according to a previously obtained demand torque value and the set buffer pressure value at first, then the displacement value is multiplied by a buffer coefficient to obtain a demand displacement value of the secondary element under the buffer state, the buffer coefficient is calculated according to three pieces of data, i.e., the current pressure of the energy accumulator, the minimum effective pressure of the energy accumulator, and the buffer pressure of the energy accumulator, and so that the displacement of the secondary element is gradually reduced with energy release after the system has entered the buffer mode, thus effectively reducing the impact generated from instant power loss.

Step 213, comparing the obtained demand displacement value of the secondary element with the obtained maximum allowable displacement of the secondary element at the current gear. If the demand displacement is less than the maximum allowable displacement, the demand displacement is used as the final displacement of the secondary element, and if the demand displacement is greater than the maximum displacement, the maximum displacement is used as the final displacement of the secondary element.

Step 215, according to a relation between the current and displacement of the secondary element, converting the displacement into a current value based on a corresponding formula to output the current value to an electromagnetic valve. D is a final control signal of the secondary element.

The control method in the above embodiment can reduce impact generated in the gear shift process and impact generated immediately before the end of the energy release process, and can also improve the driving comfort and safety of the driver, so as to achieve the purpose of releasing and using recovered energy reasonably and efficiently.

Figure 3:
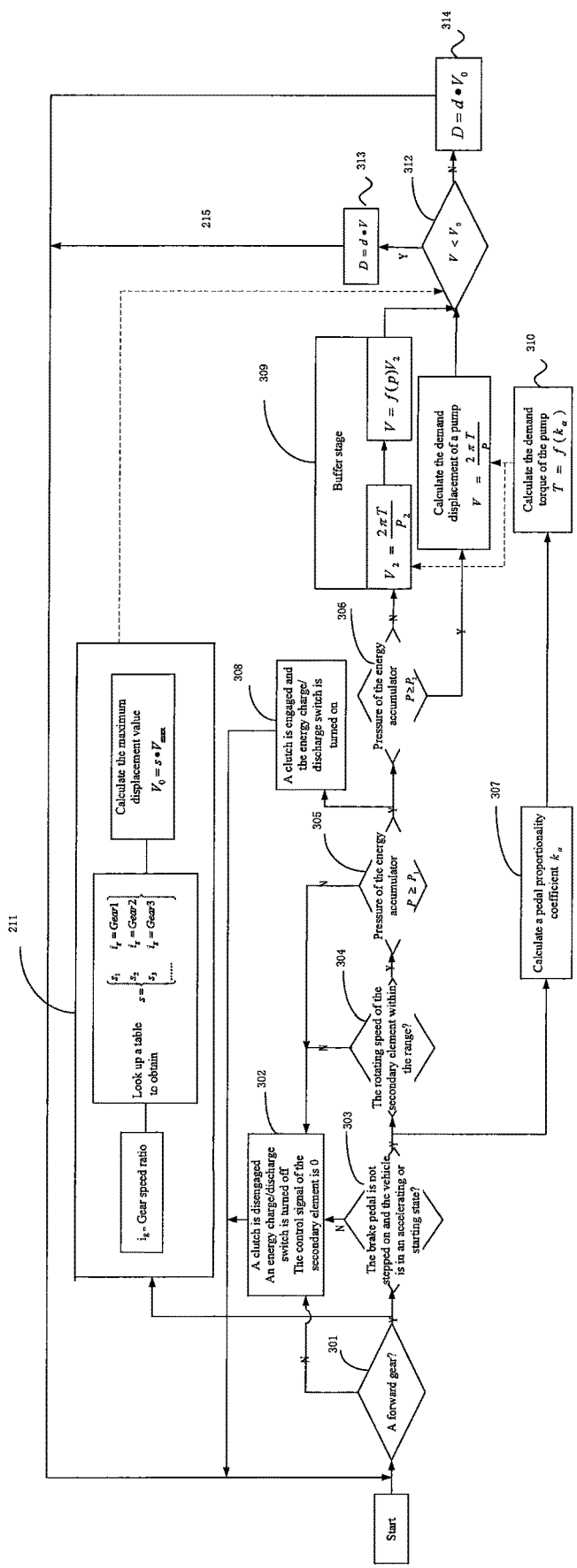
FIG. 3 is a flow chart of energy release of the power transmission control method for the crane according to the present invention.

FIG. 3 is a flow chart of energy release of the power transmission control method for the parallel oil-hydraulic hybrid power crane according to the present invention, the power transmission control method comprising the following steps as shown in FIG. 3:

Step 301, determining whether the current vehicle is in a neutral gear state, a reverse gear state or a forward gear state according to a signal collected by a sensor; if the current vehicle is in the forward gear state, proceeding to step 311.

Step 311, looking up a table according to the calculated gear value to obtain a displacement attenuation coefficient, and then calculating with both a maximum displacement value of the secondary element and the displacement attenuation coefficient to obtain the maximum allowable displacement of the secondary element at the current gear.

Step 303, judging according to a brake pedal signal collected by the sensor, and if the brake pedal is stepped on, the vehicle is determined in the brake state.

Step 304, judging according to a forward rotating speed of a gearbox collected by the sensor, if the rotating speed of the transmission shaft is within an allowable range, performing the next step, and otherwise the vehicle does not have energy recovery conditions, allowing the system not to work.

Step 305, determining whether the pressure of the energy accumulator is saturated from the pressure value of the energy accumulator collected by the sensor, and if the pressure is saturated, allowing the system not to work.

Steps 307 and 310, calculating a braking torque currently needed by the current secondary element according to a collected brake pedal percentage, maximum vehicle brake strength, vehicle mass, wheel diameter, and transmission system speed ratio.

Step 306, controlling the buffer state by the forward rotating speed of the transmission shaft, if the forward rotating speed of the transmission shaft is within the set buffer state range, allowing the vehicle to go into the buffer state, and otherwise, allowing the vehicle to be in the normal state.

If the vehicle is in the normal state, the demand displacement is calculated according to the obtained demand torque and the current pressure value of the energy accumulator.

Step 309, if the vehicle is in the buffer state, multiplying the displacement value calculated for the normal state by a buffer formula to obtain a demand displacement value under the buffer state.

The buffer formula is obtained by calculation according to the current forward rotating speed of the transmission shaft, the buffer rotating speed of the secondary element and the minimum effective rotating speed of the secondary element; the displacement of the secondary element is gradually reduced with the reduction of the rotating speed, the displacement is just reduced to zero when the rotating speed is reduced to the minimum effective rotating speed, so that the buffer effect can be achieved, not to cause power impact resulting form instantly cutting off the energy recovery system.

Step 312, comparing the obtained demand displacement value with the maximum allowable displacement value of the secondary element under the current gear state at first, if the former is greater than the later, determining the later as the final demand displacement, and otherwise, determining the former as the final demand displacement.

Steps 313 and 314, assigning a corresponding current value to the electromagnetic valve according to the corresponding relation between the current and the displacement of the secondary element. D is a final control signal of the secondary element.

According to the control method in the above embodiments, the energy recovery process can be achieved in combination with the gear state and the buffer state, thus not only can energy be effectively recovered, but also constant torque control can be achieved, and the driving comfort and safety of the driver are improved to a certain extent.

According to the control method in the above embodiment, a hybrid power system is added according to the characteristics that the crane product is large in inertia, frequent in starting and braking, and relatively high in speed, so as to recover and reuse energy of the product, so that energy can be used and recovered effectively and reasonably, and the operation habit of the driver is not changed. The problem of power impact that may be generated in the gear shift process due to addition of the energy recovery and reuse system is solved, the driving comfort and safety are improved, and with addition of the buffer stage, constant torque control is basically achieved and stability of driving force for the vehicle is ensured.

Figure 4:
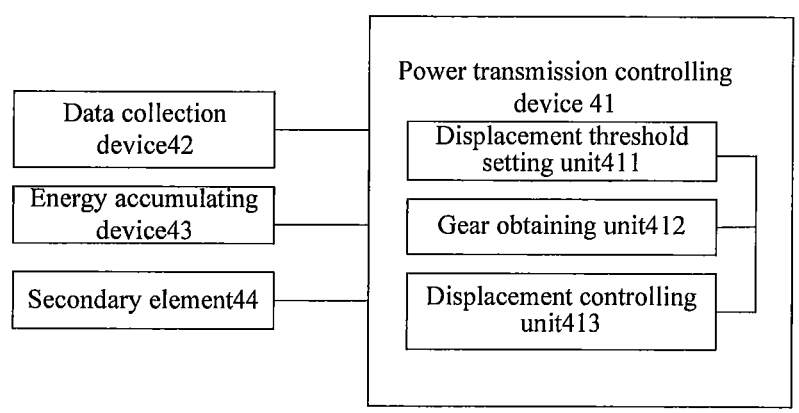
FIG. 4 is a schematic diagram of an embodiment of a power transmission control device for the crane according to the present invention.

As shown in FIG. 4, the present invention provides a power transmission control device 41 for a parallel oil-hydraulic hybrid power crane, including a displacement threshold setting unit 411, a gear obtaining unit 412 and a displacement control unit 413.

The displacement threshold setting unit 411 is configured to set the maximum working displacement of the secondary element corresponding to each gear of the crane. The gear obtaining unit 412 is configured to determine the current gear state and specific gear of the crane. The displacement controlling unit 413 is configured to determine the working mode of the secondary element according to the gear state, and stet the maximum allowable displacement of the secondary element as the maximum working displacement corresponding to the specific gear.

In one embodiment, the gear obtaining unit 412 can determine the gear state from a collected gear signal, the gear state including a neutral gear, a reverse gear and a forward gear. When determining the gear state is the neutral gear or reverse gear, the secondary element is controlled to stop operation.

The gear obtaining unit 412 can determine the travelling state of the crane from the gear state and a collected throttle signal and brake signal. The travelling state includes accelerating and braking. When the travelling state is acceleration, the displacement control unit 413 collects a rotating speed signal of the secondary element and a pressure signal of the hydraulic accumulator.

When determining the rotating speed of the secondary element exceeds a preset maximum rotating speed threshold or the pressure of the hydraulic accumulator is lower than a minimum release pressure threshold, the displacement controlling unit 413 controls the secondary element to stop operation. When determining the rotating speed of the secondary element does not exceed the preset maximum rotating speed threshold and the pressure of the hydraulic accumulator is higher than the minimum release pressure threshold, the displacement controlling unit 413 calculates the working displacement of the secondary element, wherein the working displacement is less than or equal to the maximum allowable displacement of the secondary element.

In one embodiment, when the displacement controlling unit 413 determines the pressure of the hydraulic accumulator is lower than a preset buffer pressure threshold, the displacement controlling unit 413 multiplies the working displacement of the secondary element by a preset buffer coefficient to obtain an actual working displacement of the secondary element.

When the travelling state is braking, the displacement controlling unit 413 collected a pressure signal of the hydraulic accumulator and a rotating speed signal of the transmission shaft. When determining the rotating speed of the transmission shaft is not within a preset recovery rotating speed range or the hydraulic accumulator is in a full state, the displacement controlling unit 413 controls the secondary element to stop operation.

When determining the rotating speed of the transmission shaft is within the preset recovery rotating speed range and the hydraulic accumulator is in a non-full state, the displacement controlling unit 413 calculates the working displacement of the secondary element, wherein the working displacement is less than or equal to the maximum allowable displacement of the secondary element.

In one embodiment, when determining a forward rotating speed of the transmission shaft is within a preset buffer rotating speed range, the displacement controlling unit 413 multiplies the working displacement of the secondary element by a preset buffer coefficient to obtain an actual working displacement of the secondary element, and when the forward rotating speed of the transmission shaft is the minimum effective rotating speed, reduces the actual working displacement of the secondary element to zero.

The present invention provides a parallel oil-hydraulic hybrid power crane, including the power transmission control device for the crane as described above.

According to the power transmission control method and device for the crane and the crane of the present invention, in consideration of the characteristics that such an engineering machinery product as the crane is high in mass and has many gears, the maximum displacement of the secondary element is controlled for different gears, thus the power impact generated by the hybrid power system during gear shift can be effectively reduced. As the buffer mode is added in the energy release and use processes, the power output of the secondary element can be slowly reduced to zero with continuous release of energy, thus avoiding the influence on a vehicle due to loss of instant power generated at the moment of energy release completion and improving the comfort and safety of the driver. In consideration of the influence of the rotating speed on the recovery process, the buffer mode is added in the energy recovery process, thus avoiding vehicle jitter due to instable power resulting from the vehicle at low speed or a system suddenly disconnected, and improving the comfort and safety of the driver.

According to the power transmission control method and device for the crane and the crane of the present invention, the product of the displacement of the secondary element and the pressure of the energy accumulator is a certain value, constant-torque power output is achieved, and a stable driving force is provided to the vehicle, so that additional impact generated due to addition of the energy recovery system can be reduced as much as possible. Moreover, the rotating speed of the secondary element is limited, so that it can ensure that the secondary element does not exceed the maximum rotating speed to prolong its service life, and the minimum rotating speed thereof is also limited to ensure the secondary element works within a stable rotating speed range and to improve the energy recovery efficiency.

The method and system of the present invention may be achieved in many ways. For example, the method and system of the present invention can be achieved through software, hardware, firmware or any combination thereof. The above sequences for the steps of the method are merely used for illustration. The steps of the method of the present invention are not limited to the sequences specifically described above, unless otherwise specifically illustrated. Moreover, in some embodiments, the present invention also can be implemented as programs recorded in a record medium, and these programs include machine readable instructions for achieving the method according to the present invention. Therefore, the present invention also covers the record medium storing programs for executing the method according to the present invention.

The description of the present invention is given for exemplification and description, but is not exhaustive and does not limit the present invention to the disclosed forms. Many modifications and changes are obvious to those of ordinary skill in the art. The embodiments are selected and described for better illustration of the principle and actual application of the present invention, and those of ordinary skill in the art can understand the present invention so as to design various embodiments with various modifications applicable to specific uses.

The invention claimed is:

1. A power transmission control method for a crane, comprising:
   determining a current gear state and a specific gear of the crane;
   determining a working mode of the secondary element from the gear state;
   determining a displacement attenuation coefficient according to the specific gear; and
   calculating a maximum allowable displacement of the secondary element corresponding to the specific gear according to a maximum displacement value of the secondary element and the displacement attenuation coefficient.

2. The method of claim 1, wherein the gear state is determined from a collected gear signal, the gear state comprising a neutral gear, a reverse gear and a forward gear,
   the method further comprising controlling the secondary element to stop operation when the gear state is the neutral gear or reverse gear.

3. The method of claim 2, further comprising:
   determining a travelling state of the crane from the gear state and an acquired throttle signal and brake signal, the travelling state comprising one of acceleration and braking;
   collecting a rotating speed signal of the secondary element and a pressure signal of a hydraulic accumulator when the travelling state is acceleration;
   controlling the secondary element to stop operation when the rotating speed of the secondary element exceeds a preset maximum rotating speed threshold or the pressure signal of the hydraulic accumulator is lower than a minimum release pressure threshold;
   calculating a working displacement of the secondary element in real time when the rotating speed of the secondary element does not exceed the preset maximum rotating speed threshold and the pressure of the hydraulic accumulator is higher than the minimum release pressure threshold, wherein the working displacement is less than or equal to the maximum allowable displacement of the secondary element.

4. The method of claim 3, further comprising:
   multiplying the working displacement of the secondary element by a preset first buffer coefficient to obtain an actual working displacement of the secondary element when the pressure of the hydraulic accumulator is lower than a preset buffer pressure threshold.

5. The method of claim 3, further comprising:

collecting a pressure signal of the hydraulic accumulator and a rotating speed signal of a transmission shaft when the travelling state is braking;

controlling the secondary element to stop operation when the rotating speed of the transmission shaft is not within a preset recovery rotating speed range or the hydraulic accumulator is in a full state; and calculating the working displacement of the secondary element in real time when the rotating speed of the transmission shaft is within the preset recovery rotating speed range and the hydraulic accumulator is in a non-full state, wherein the working displacement is less than or equal to the maximum allowable displacement of the secondary element.

6. The method of claim 5, further comprising:

multiplying the working displacement of the secondary element by a preset second buffer coefficient to obtain an actual working displacement of the secondary element when a forward rotating speed of the transmission shaft is within a preset buffer rotating speed range, and reducing the actual working displacement of the secondary element to zero when the forward rotating speed of the transmission shaft is the minimum effective rotating speed.

7. A power transmission control device for a crane, comprising:

a gear obtaining unit, configured to determine a current gear state and specific gear of the crane;

a discharge controlling unit, configured to determine a working mode of the secondary element from the gear state, to determine a displacement attenuation coefficient according to the specific gear, and to calculate a maximum allowable displacement of the secondary element corresponding to the specific gear according to a maximum displacement value of the secondary element and the displacement attenuation coefficient.

8. The device of claim 7, wherein the gear obtaining unit is further configured to determine the gear state from a collected gear signal, the gear state comprising a neutral gear, a reverse gear and a forward gear, wherein the secondary element is controlled to stop operation when the gear state is the neutral gear or reverse gear.

9. The device of claim 8, wherein the gear obtaining unit is further configured to determine a travelling state of the crane from the gear state and a collected throttle signal and brake signal, the travelling state comprising one of acceleration and braking;

the displacement controlling unit is further configured to collect a rotating speed of the secondary element and a pressure signal of a hydraulic accumulator when the travelling state is accelerating;

control the secondary element to stop operation when the rotating speed of the secondary element exceeds a preset maximum rotating speed threshold or the pressure of the hydraulic accumulator is lower than a minimum release pressure threshold; and calculate a working displacement of the secondary element when the rotating speed of the secondary element does not exceed the preset maximum rotating speed threshold and the pressure of the hydraulic accumulator is higher than the minimum release pressure threshold, wherein the working displacement is less than or equal to the maximum allowable displacement of the secondary element.

10. The device of claim 9, wherein the displacement controlling unit is further configured to multiply the working displacement of the secondary element by a preset buffer coefficient to obtain an actual working displacement of the secondary element when the pressure of the hydraulic accumulator is lower than a preset buffer pressure threshold.

11. The device of claim 10, wherein the displacement controlling unit is further configured to collect a pressure signal of the hydraulic accumulator and a rotating speed signal of a transmission shaft when the travelling state is braking; to control the secondary element to stop operation when the rotating speed of the transmission shaft is not within a preset recovery rotating speed range and the hydraulic accumulator is in a full state; and to calculate the working displacement of the secondary element when the rotating speed of the transmission shaft is within the preset recovery rotating speed range and the hydraulic accumulator is in a non-full state, wherein the working displacement is less than or equal to the maximum allowable displacement of the secondary element.

12. The device of claim 11, wherein the discharge controlling unit is further configured to multiply the working displacement of the secondary element by a preset buffer coefficient to obtain an actual working displacement of the secondary element when a forward rotating speed of the transmission shaft is within a preset buffer rotating speed range, and reduce the actual working displacement of the secondary element to zero when the forward rotating speed of the transmission shaft is the minimum effective rotating speed.

13. A parallel-type oil-hydraulic hybrid power crane, comprising the power transmission control device of the crane of claim 7.

* * * * *